Patented Sept. 29, 1942

2,297,276

UNITED STATES PATENT OFFICE 2,297,276

PROTEIN COMPOSITION AND FOAM ABATEMENT

Francis Clarke Atwood, Newton, Mass., assignor to Atlantic Research Associates, Inc., Wilmington, Del., a corporation of Delaware No Drawing. Application January 25, 1938, Serial No. 186,910

1 Claim. (Cl. 106—146)

This invention relates to novel protein compositions having various desirable characteristics, including minimum foaming characteristics and to methods of abating or preventing foaming in aqueous protein compositions.

The invention has for one of its objects the abatement or prevention of foaming in protein compositions such as aqueous compositions embodying casein produced from animal milk or from the proteins of soya bean, or other seeds; and the foaming in compositions embodying blood and egg albumen; and in compositions of other proteins produced from leguminous materials, more frequently called vegetable caseins.

The invention has for another object the production of novel and highly useful protein compositions, and particularly casein compositions characterized by their stability over long periods of time by increased plasticity and having other characteristics which render them especially suitable for the manufacture of paints, emulsions, glues, sizes, coating compositions, transparent films, and as the basis for printing inks.

With these objects in view, and such others as may hereinafter appear, the invention consists in the novel protein compositions and in the method of abating and preventing foaming in aqueous protein solutions and dispersions hereinafter described and particularly defined in the claim at the end of this specification.

In general, the present invention contemplates the production of an aqueous protein composition of the character above set forth containing one or more esters of the type substantially immiscible with water, i. e., having low solubility therein, and in a sufficient amount with respect to the water content of the composition such that there is present an amount of undissolved ester in excess of that required to satisfy the solubility thereof in the water content of the composition. The esters which I have found most suitable for the production of the present protein compositions are of the type having boiling points higher than water, and their utility has been particularly great with aqueous protein compositions in which the protein content does not exceed 25% and is preferably less than 15% of the aqueous composition.

Throughout the specification and claims, the term solution is used to define and include solutions, dispersions and colloidal suspensions.

As a result of research, I have found that esters of the type substantially immiscible with water and having boiling points higher than water may be incorporated with advantage in aqueous protein compositions in order to reduce to a minimum the tendency of the composition to foam, and also for the purpose of abating foam in compositions possessing foaming characteristics. In addition, those esters having boiling points higher than water and which are partially soluble in water may be similarly incorporated in aqueous protein compositions provided that an amount of ester is utilized in excess of that required to satisfy the solubility thereof in the aqueous solutions of the proteins, so that there is present at least a molecular layer of undissolved ester between the surface of the protein solution and the surface of the adjacent air layer.

My theory concerning the formation of foam and the abatement or prevention of foam in these aqueous solutions of proteins concerns the reaction probably taking place at the interface between the protein solution, the air phase and the film or layer of anti-foam material. In order to form the foam in the first place, it is probable that the concentration of the protein material becomes greater in the interface in that the surface tension of the water is thereby lowered thus enabling the bubble of foam to form. When an anti-foam material is present in an amount exceeding the amount required to saturate the protein film with the anti-foam material, then the concentration at the interface between the anti-foam material and the protein solution becomes such that the protein solution is actually precipitated out of its water solution or else it is so low in concentration that it cannot any longer lower the surface tension of the water. The surface tension of the water, therefore, becomes normal or possibly greater than that of ordinary water due to the introduction of the anti-foam material. As a consequence, the surface tension now becomes so great that the bubble bursts and the protein solution of the bubble sinks back to its former level in the main body of the solution.

In support of my theory of foam prevention and foam abatement in protein solutions of the character specified, my experiments have indicated that it is possible to add sufficient of the foam abating or preventing material to saturate the protein solution in which it is desired to destroy the foam, and while the foam may subside during the addition of the anti-foaming agent, yet the foam can be brought back as soon as the agent is completely mixed or dissolved in the protein or foaming solution. On the other hand, if the amount of anti-foaming material is sufficient to not only saturate the foaming solution but yield a separate phase as well, then the desirable effect of the anti-foaming agent in destroying the foam is rendered permanent.

In order to accomplish this result, I have found that compounds immiscible in water, i. e., of at least limited solubility therein, are necessary and that the polar relation with respect to the water must be such that some part of the molecule should exhibit solubility in water thereby so polarizing itself with respect to water that there is not a chaotic solution of the molecules next to the molecular layers but rather that part of the molecule which is normally soluble or slightly soluble in water will form a hydrophilic layer next to the protein solution and thereafter accomplish the desired result of breaking down the foam. A large number of experiments have indicated that the present anti-foam esters including those substantially immiscible in water, i. e., those of limited solubility in water, when incorporated into an aqueous solution of a protein of the character described and in an amount greater than that necessary at any particular time to satisfy the solubility of the particular ester in the water, results in the presence of at least a molecular layer of undissolved ester between the surface of the protein solution and the adjacent surface of the air layer, producing the desired effect in abating or eliminating foam from this character of solutions.

Among the esters with which I have experienced satisfactory results, may be mentioned the following:

Glyceryl chlorhydrin
Butyl formate
Butyl acetate
Butyl lactate
Butyl oxalate
Butyl stearate
Butyl ricinoleate
Ethyl abietate
Diethyl tartrate
Methyl chloroacetate
Methyl butyrate
Methyl aminobenzoate
Dimethyl benzoate
Dimethyl succinate
Dimethyl phthalate
Dimethyl acetate
Dimethyl malate
Dimethyl malonate
Propylneglycol diacetate Diamyl tartrate
Diethyl phthalate
Diethyl malonate
Diethyl malate
Diethyl oxalate
Ethyl acetate
Diethyl carbonate
Dibutyl phthalate
Dibutyl tartrate
Methyl salicylate
Propyl salicylate
Amyl stearate
Amyl lactate
Amyl acetate
Triamyl borate
Glycol diacetate
Glycerol diacetate
Glycerol triacetate
Isopropyl acetate and also other esters of the type having boiling points higher than that of water. Included in the above described general class are liquid lower aliphatic esters, examples of which are: butyl formate, acetate, lactate and oxalate, ethyl lactate, diethyl tartrate, malonate, malate, and oxalate, diamyl tartrate, dibutyl tartrate, methyl chloroacetate, methyl butyrate, dimethyl succinate, malate and malonate, amyl acetate, glycol diacetate, glycerol di- and triacetate, isopropyl acetate, and diethyleneglycol monoacetate.

The present protein composition embodying, as has been stated, sufficient esters selected from the classes of esters described, and having boiling points higher than the water, finds particular use as a coating material and the prevention of the formation of foam during the application of the composition to a surface and particularly to a porous surface, such as paper, or a plastered wall. As the composition sinks into the wall or paper a certain amount of air is displaced which is forced out through the layer of the coating material as the latter is drying down. If the surface tension of this film as it is drying is so low that the air being forced out can readily form a bubble, then as this bubble dries it leaves a crater or a pimple in the finished film. This not only tends to weaken the film, but leaves unsightly marks or effects upon the surface. If on the other hand the composition embodies any of the present foaming agents in a sufficient amount so that there is always present an undissolved layer of the anti-foaming material, the surface tension of the film of coating composition is not low enough to form bubbles, and in addition the relatively high surface tension thereof tends to prevent the air from coming out through the film, and when it does come out the air is immediately released and the surface of the film pulled together again by the high surface tension. By utilizing such an anti-foaming ester, the formation of a hard skin and surface imperfections is prevented over longer periods of time after the application of the film.

As above stated the present invention is applicable to stable casein solutions, including animal and vegetable caseins, as milk and soya casein, stable solutions of resinified casein, i. e., the reaction products with casein of various fatty acids, organic acids, polyoses and soluble polyatomic esters, and also solutions of ordinary resinified casein and particularly to those protein compositions containing pigments such as paint and ink and paper coating compositions. The present anti-foam materials are particularly effective in those protein solutions which show the greatest tendency to foam, for example, in casein solutions where the concentration of casein is less than one part to eight parts of water.

As illustrative of typical compositions embodying the present invention, the following examples are given:

Example I

| | Parts |
|---|---|
| Casein | 100 |
| Sodium fluoride | 10 |
| Borax | 15 |
| Water | 500 |
| Pigment | 855 |
| Butyl acetyl ricinoleate | 20 |

Example II

| | Parts |
|---|---|
| Casein | 100 |
| Borax | 15 |
| Water | 500 |
| Sodium pentachlor phenol | 1 |
| Dibutyl tartrate | 20 |

Heat two hours at 165 degrees F.

Example III

| | Parts |
|---|---|
| Casein | 100 |
| Triethanolamine abietate | 25 |
| Water | 500 |
| Diethyl phthalate | 20 |

Suspend casein in water and heat with resinifying agent until clear solution is obtained.

Example IV

| | Parts |
|---|---|
| Casein | 100 |
| Sodium fluoride | 10 |
| Borax | 15 |
| Water | 500 |
| Pigment | 855 |
| Butyl acetyl ricinoleate | 10 |
| Butyl ether of ethylene glycol | 10 |

Casein, when dispersed in water forms a gel-like structure at some temperatures. In general the casein type of proteins form a gel without a short melting point. It is the general nature of such a gel to shrink over a long period of time in such a way that there may be formed a liquid and a fibrous or sponge like structure of higher melting point or which may even be insoluble. The process by which this gel contracts and expresses the liquid is called syneresis. I have found in other inventions that the syneresis of my casein solution or even a hydrolitic cleavage of the casein molecule may be indefinitely deferred by heating the casein solution to a temperature of 160 to 165 degrees F. for an hour or more; by use of plumping or swelling salts such as sodium or ammonium fluoride, sodium formate, sodium stannate, etc., or by a combination of both. The resulting casein solution is characterized by its stability and uniform viscosity over long periods of time and is herein referred to as a stable casein solution.

I have found the casein solutions produced as above described to be substantially less viscous than comparable solutions thinned with an equivalent amount of water, and much less viscous than before the addition of the solvent or solvents. The casein solutions thinned with the esters as above described, will flow easily, remain smooth in appearance, retain their useful adhesive properties, and remain stable for long periods of time regardless of whether the solution has been made slightly basic alkaline or slightly acidic. The slightly acidic solutions, of course, have a pH value of less than 7.0.

By incorporating the anti-foam agents in the protein solution, much better wetting of the pigments is obtained and air is eliminated so that the volume of the mass for a given weight is less and in general, the viscosity is lowered. This change in viscosity appears to be brought about by the elimination of the air which otherwise tends to impart to the solution an elasticity or yield value which is false and disappears as soon as the air is eliminated. Under the microscope nearly all casein shows minute air bubbles and these air bubbles are retained in the casein as it swells and goes into solution. It is extremely difficult to remove this air because of the finely divided condition of the bubbles and the present anti-foam agents assist in eliminating the occluded air as well as the air which is entrapped during the mixing process, so that the resulting change in viscosity makes for better flow properties and better adhesive characteristics. In other words, the elimination of the air by this method and the consequent increased wetting effect makes for better cohesiveness within my casein solution and as a consequence it becomes very much simpler as a practical matter for the user of paint or other casein products to thin the composition with water or similar thinners. In some cases where the esters have definite hydrophilic properties I have found that the casein solution will show an actual lowered viscosity because of the changed equilibrium with respect to the hydration of the casein gel structure.

This application is a continuation in part of my copending application, Serial No. 442,997, filed April 9, 1930.

Having thus described the invention, what is claimed is:

A casein paint comprising an aqueous casein dispersion, a pigment, and as a foam abating agent, an aliphatic ester having a boiling point higher than water and which is not completely soluble in water, the amount of said ester in said paint being in excess of that necessary to satisfy the solubility of the ester in the water of the dispersion whereby at least a part of said ester in the paint is undissolved in the water.

FRANCIS CLARKE ATWOOD.

CERTIFICATE OF CORRECTION.

Patent No. 2,297,276.   September 29, 1942.

FRANCIS CLARKE ATWOOD.

It is hereby certified that error appears in the printed specification of the above numbered patent requiring correction as follows: Page 2, first column, line 46, in the table, for "Dimethyl benzoate" read --Methyl benzoate--; line 49, for "Dimethyl acetate" read --Methyl acetate--; and that the said Letters Patent should be read with this correction therein that the same may conform to the record of the case in the Patent Office.

Signed and sealed this 17th day of November, A. D. 1942.

(Seal)

Henry Van Arsdale,
Acting Commissioner of Patents.

CERTIFICATE OF CORRECTION.

Patent No. 2,297,276. September 29, 1942.

FRANCIS CLARKE ATWOOD.

It is hereby certified that error appears in the printed specification of the above numbered patent requiring correction as follows: Page 2, first column, line 46, in the table, for "Dimethyl benzoate" read --Methyl benzoate--; line 49, for "Dimethyl acetate" read --Methyl acetate--; and that the said Letters Patent should be read with this correction therein that the same may conform to the record of the case in the Patent Office.

Signed and sealed this 17th day of November, A. D. 1942.

Henry Van Arsdale,
Acting Commissioner of Patents.

(Seal)